United States Patent
Schaffer et al.

(10) Patent No.: US 11,105,457 B2
(45) Date of Patent: Aug. 31, 2021

(54) SEPARABLE THREADED CONNECTION WITH ASYMMETRIC COATING

(71) Applicant: VOESTALPINE TUBULARS GMBH & CO KG, Kindberg-Aumühl (AT)

(72) Inventors: Markus Schaffer, Krieglach (AT); Peter Winkler, Krieglach (AT); Reinhard Leitner, Kindberg (AT); Thomas Schalkhammer, Wiesmath (AT)

(73) Assignee: VOESTALPINE TUBULARS GMBH & CO KG, Kindberg-Aumühl (AT)

( * ) Notice: Subject to any disclaimer, the term of this patent is extended or adjusted under 35 U.S.C. 154(b) by 241 days.

(21) Appl. No.: 15/542,683

(22) PCT Filed: Dec. 29, 2015

(86) PCT No.: PCT/AT2015/000165
§ 371 (c)(1),
(2) Date: Jul. 11, 2017

(87) PCT Pub. No.: WO2016/112415
PCT Pub. Date: Jul. 21, 2016

(65) Prior Publication Data
US 2018/0031170 A1 Feb. 1, 2018

(30) Foreign Application Priority Data
Jan. 13, 2015 (AT) .................................... A 16/2015

(51) Int. Cl.
*F16L 58/14* (2006.01)
*F16L 57/06* (2006.01)
(Continued)

(52) U.S. Cl.
CPC ................ *F16L 58/14* (2013.01); *B05D 1/02* (2013.01); *B05D 1/18* (2013.01); *E21B 17/042* (2013.01);
(Continued)

(58) Field of Classification Search
CPC ....... F16L 58/14; F16L 57/06; F16L 58/1009; F16L 58/182; F16L 58/02; F16L 58/08;
(Continued)

(56) References Cited

U.S. PATENT DOCUMENTS 4,468,309 A   8/1984 White
4,630,849 A   12/1986 Fukui et al.
(Continued)

FOREIGN PATENT DOCUMENTS

CA      2592730 C  *  9/2009  ........... E21B 17/042
DE   102012108433 B3   1/2014
(Continued)

OTHER PUBLICATIONS

International Search Report for PCT/AT2015/000165 dated Mar. 14, 2016; English translation submitted herewith (15 pages).
(Continued)

*Primary Examiner* — Matthew Troutman
*Assistant Examiner* — William S. Choi
(74) *Attorney, Agent, or Firm* — Fitch, Even, Tabin & Flannery, LLP

(57) ABSTRACT

A screw joint has a tubular element with a female thread and a tubular element with a male thread, wherein the male thread and the female thread have first contact surfaces that cooperate with each other, and the tubular elements optionally have second contact surfaces adjacent to the female thread and/or the male thread, wherein the first contact surfaces and the optional second contact surfaces each have a coating including a first and a second layer, wherein the
(Continued)

Figure 1:
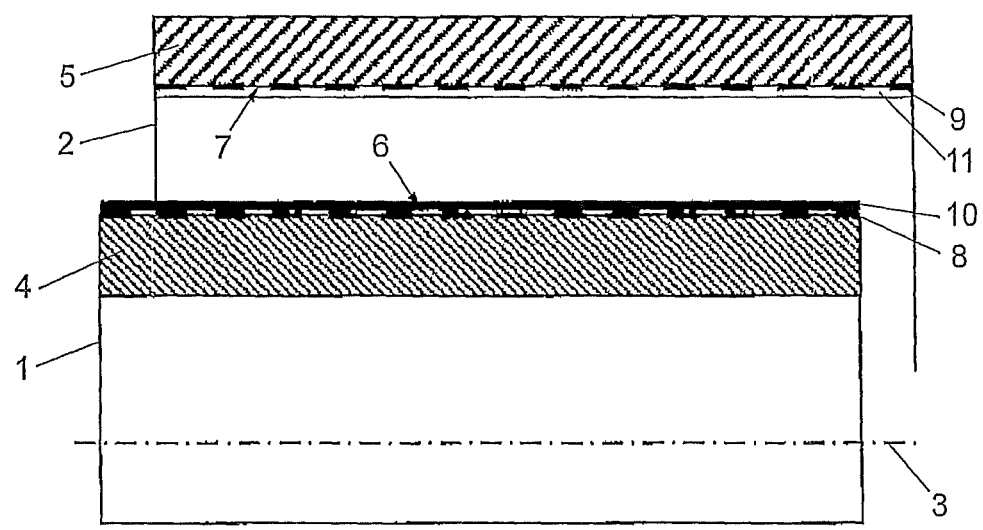

first layer is formed as a conversion layer in each case, one of the first contact surfaces that cooperate with each other has a second layer made of ceramic material with a friction reducing effect and the other of the two contact surfaces that cooperate with each other has, as a second layer, a varnish layer with a binding agent made of an organic polymer throughout which solid lubricant particles are distributed.

36 Claims, 3 Drawing Sheets

(51) Int. Cl.
F16L 58/10 (2006.01)
F16L 58/06 (2006.01)
F16L 15/08 (2006.01)
F16L 15/06 (2006.01)
B05D 1/02 (2006.01)
B05D 1/18 (2006.01)
E21B 17/042 (2006.01)
F16L 15/00 (2006.01)

(52) U.S. Cl.
CPC ............ *F16L 57/06* (2013.01); *F16L 58/1009* (2013.01); *F16L 15/001* (2013.01); *F16L 15/08* (2013.01); *F16L 58/06* (2013.01)

(58) Field of Classification Search
CPC .......... F16L 58/184; F16L 58/04; F16L 15/08; F16L 15/001; F16L 58/06; B05D 1/02; B05D 1/18; E21B 17/042
USPC ...................................... 285/55, 94
See application file for complete search history.

(56) References Cited

U.S. PATENT DOCUMENTS

| 5,454,605 | A | 10/1995 | Mott et al. |
| 5,494,566 | A | 2/1996 | Gould et al. |
| 5,545,489 | A | 8/1996 | Tanaka et al. |
| 6,659,509 | B2 | 12/2003 | Goto et al. |
| 8,562,771 | B2* | 10/2013 | Ribalta ................ F16L 58/182 285/94 |
| 8,857,857 | B2 | 10/2014 | Goto |
| 9,169,951 | B2 | 10/2015 | Goto |
| 9,863,190 | B2 | 1/2018 | Gard et al. |
| 2003/0066641 | A1 | 4/2003 | Yamamoto et al. |
| 2005/0176592 | A1* | 8/2005 | Calvo ................... F16L 58/182 508/128 |
| 2008/0038083 | A1* | 2/2008 | Student ................. F16L 15/001 411/378 |
| 2009/0033087 | A1 | 2/2009 | Carcagno et al. |
| 2009/0236850 | A1 | 9/2009 | Goto et al. |
| 2010/0059986 | A1 | 3/2010 | Kimoto et al. |
| 2010/0167968 | A1* | 7/2010 | Pinel ....................... F16L 57/06 285/94 |
| 2010/0301600 | A1* | 12/2010 | Goto ..................... F16L 58/182 285/333 |
| 2011/0084477 | A1 | 4/2011 | Mallis et al. |
| 2011/0220415 | A1* | 9/2011 | Jin ................................... 175/57 |
| 2013/0277961 | A1 | 10/2013 | Goto et al. |
| 2014/0284919 | A1* | 9/2014 | Goto ..................... F16L 58/182 285/94 |

FOREIGN PATENT DOCUMENTS

| DE | 102012023349 A1 | 6/2014 |
| EP | 0157587 A2 | 10/1985 |
| EP | 0329990 A1 | 8/1989 |
| EP | 1411288 A1 | 4/2004 |
| EP | 2128506 A1 | 12/2009 |
| JP | 2001065751 A | 3/2001 |
| JP | 2003074763 A | 3/2003 |
| WO | WO2006/104251 A | 10/2006 |
| WO | 2008032872 A1 | 3/2008 |
| WO | 2012060474 A1 | 5/2012 |

OTHER PUBLICATIONS

Robert W Schwartz et al.: "Chemical solution deposition of electronic oxide films", Comptes Rendus-Chimie, Elsevier, Paris, FR, Bd. 7, pp. 433-461 (Jan. 1, 2004).

PCT International Preliminary Examination Report for PCT/AT2015/000165 dated Jun. 26, 2017 (English translation).

* cited by examiner

SEPARABLE THREADED CONNECTION WITH ASYMMETRIC COATING

CROSS-REFERENCE TO RELATED APPLICATIONS

This application is a U.S. national phase application filed under 35 U.S.C. § 371 of International Application No. PCT/AT2015/000165, filed Dec. 29, 2015, designating the United States, and claims priority from Austrian Patent Application No. A 16/2015, filed Jan. 13, 2015, and the complete disclosures of which applications are hereby incorporated herein by reference in their entirety for all purposes.

The invention relates to a screw joint comprising a tubular element with a female thread and a tubular element with a male thread, wherein said male thread and said female thread have first contact surfaces that cooperate with each other, and the tubular elements have second contact surfaces preferably adjacent to said female thread and/or said male thread, wherein said first contact surfaces and, if applicable, said second contact surfaces each have a coating at least comprising a first and a second layer, wherein said first layer is formed as a conversion layer in each case.

The invention further relates to a method for surface treatment of threads of a threaded connection of tubular elements comprising the application of a coating onto said first contact surfaces that cooperate with each other of a female thread and a male thread of said threaded connection and preferably the application of a coating onto the second contact surfaces that cooperate with each other of said tubular elements adjacent to said female and/or male thread, wherein the coating comprises the application of at least a first layer and the application of a second layer on said first layer, wherein a conversion layer is applied onto said contact surface as a first layer in each case.

In particular, the invention relates to screw joints that are required to screw together steel pipes used in the crude oil and natural gas production industry. It is known that threaded connections used in the crude oil and natural gas production industry are exposed to very high surface pressures due to the screwing and the effective load. Many of these connections have to be screwed and loosened again several times. Pipes used in the crude oil and natural gas production industry (commonly known as OCTG pipes—Oil Country Tubular Goods) are in particular used as casing and standpipes for the development of crude oil and natural gas reservoirs.

High requirements are imposed on the screw connections of the aforementioned pipes. Since the threads are prone to fretting due to the high contact pressure of the thread surfaces that cooperate with each other, precautions must be taken in order to prevent fretting and general mutual damage. Further, there must be an adequate corrosion resistance. Relevant standards also specify that the threaded connection shall be adapted for screwing together and loosening the screw connection several times (up to 10 times). Other standards in the area of crude oil casing pipes even require the connection to be screwed again 100 times.

In the simplest case one tries to prevent damage of the threads by means of application of thread lubricant. However, the need for greasing should be avoided as far as possible, as the effort caused by this is considerable, particularly when regreasing becomes necessary due to screwing and loosening the screw connection several times.

Further, chemically converting the surface of the material of the thread surfaces or applying another material onto them is a known method of obtaining a conversion layer. Conversion layers are usually produced by a chemical reaction of an aqueous treatment solution with a metal substrate and provide a very good basis for the adhesion of subsequent coatings and significantly increase the corrosion resistance of the base material in comparison with untreated material surfaces. This includes phosphating the thread surfaces. Further, in the state of the art, surface coating of thread surfaces with all kinds of substances that are said to increase the characteristics of screw connections is described. However, the coatings known are inadequate in order to sufficiently meet all requirements.

Therefore, the present invention aims at improving a threaded connection to the effect that greasing of a threaded connection (particularly of the thread pitches, metal sealing seat and shoulder surface) of pipes can be avoided, even in case of connecting pipe sections several times. Fretting susceptibility shall be decreased considerably. Further, the number of cycles consisting of screwing and loosening the connection shall be increased at constant torque performance, wherein the tightness of the connection has to be guaranteed.

To resolve this task, the invention concerning a threaded connection of the above-mentioned type primarily consists in one of the first and, if applicable, the second contact surfaces that cooperate with each other having as a second layer a layer made of a ceramic material with a friction-reducing effect and the other of the two contact surfaces that cooperate with each other having as a second layer a varnish layer, in which solid lubricant particles are distributed, comprising a binding agent made of an organic polymer. As a result, said two contact surfaces that cooperate with each other each have at least two layers, wherein the layer referred to as "second layer" according to the present invention is preferably the outermost layer in each case, at which the male and the female thread are in contact with each other. Said second layer of the female thread is formed from a different material than the second layer of the male thread, namely from a ceramic material with a friction-reducing effect on the one side and a varnish with a binding agent made of an organic polymer on the other side, wherein said material is always chosen in such a way that said second layers do not chemically react with each other, i.e. they do not form a chemical compound. Thus, the fretting susceptibility can be reduced drastically and the connection can be loosened several times.

Preferably, it is provided for that said second layer made of ceramic material is formed on the tubular element with the female thread and said second layer consisting of a varnish layer is formed on the tubular element with the male thread.

Said second layer made of the ceramic material significantly increases the corrosion protection on thread surfaces without varnish. Further, said layer in combination with the first layer, particularly when it is formed as a manganese phosphate layer according to a preferred embodiment, has a particularly friction-reducing effect.

Preferably, the first layer is formed as a phosphate layer, wherein it preferably consists of manganese phosphate, iron phosphate and/or zinc phosphate with the addition of nickel salts, if necessary, particularly preferably of manganese phosphate and zinc phosphate and most preferably of manganese phosphate.

On the contact surface between the layer made of ceramic material with friction-reducing effect and the varnish layer with solid lubricant particles, according to the invention, a very low kinetic friction is achieved without greasing being necessary. The low kinetic friction is maintained over a long period of time and is also guaranteed after tightening and loosening the connection several times without essentially impairing the friction characteristics.

Preferably, it is provided for that the layer thickness of the varnish layer and the portion of lubricant are chosen in such a way that these can be tightened and loosened at least more than 10 times with crude oil conveyor pipes without galling of the material and, preferably, even more than 100 times with crude oil casing pipes, without destroying the lubricating effect of the varnish layer.

In order for the thread geometry of the coated thread to remain unchanged compared to the uncoated embodiment, the thickness of the applied layers must be kept as thin as possible. In this respect, a preferred embodiment provides that said thickness of the coating of the first contact surfaces that cooperate with each other is less than 120 µm, preferably less than 70 µm.

According to the invention, the ceramic layer can be formed to be particularly thin without impairing its friction-reducing and corrosion-protective effect. In particular, said layer can be formed as a nanocoating, wherein it is preferably provided for that the layer thickness of said ceramic layer is less than 1 µm, preferably less than 200 nm, particularly preferably between 10 and 100 nm.

Such a thin application can be preferably obtained such that said ceramic layer consists of a wet chemical, self-depositing precipitate or a ceramic prepolymer with organic components applied by means of coating.

Preferably, it is provided for that said ceramic layer includes a resin, such as melamine resin, or a hydrophobing agent, in particular is waterproofed with it, in order to increase corrosion resistance.

Said resin or hydrophobing agent for waterproofing the nanolayers serves the temporary corrosion protection, but also compresses the porous nanolayer in the long term and increases its ductility (as a result, the brittle characteristics of the ceramic material are reduced).

In order to prevent the penetration of water, various resins and known hydrophobing agents can be applied. As a resin, all resins with sufficient stability can be used, e.g. melamine resins or siloxanes (e.g. PDMS-based) with good technical properties. These often have to be baked in order to obtain sufficient stability. Alkoxysilanes with hydrophobical side groups or their oligomers and polymers are known hydrophobing agents, e.g. dynasilanes of the types F8815 or F8261.

The ceramic layer preferably comprises titanium, zirconium, niobium, tantalum, molybdenum, chromium, silicon and/or germanium oxides. In particular, the ceramic layer consists of an oxide selected from the group consisting of titanium, zirconium, niobium, tantalum, molybdenum, chromium, silicon, vanadium, tungsten, germanium oxides and/or combinations thereof. Particularly preferably, the ceramic layer consists of silicon oxide, namely quartz.

As already mentioned, the first layer is a layer preferably produced by means of phosphating the contact surface. In particular, this is a manganese phosphate layer in this case, wherein both the first layer formed on the male thread and the first layer formed on the female thread are produced by means of phosphating, in particular they are formed as manganese phosphate layers. Said manganese phosphate layer is preferably produced in a hot bath process and can alternatively be galvanically precipitated.

On the one hand, the varnish layer increases the corrosion protection and on the other hand, it is a carrier for the solid lubricant particles distributed therein. The layer thickness of the varnish layer is between 5 and 80 µm, particularly preferably between 10 and 40 µm, in the area of the first contact surfaces in order to not impair the thread geometry.

The coating according to the invention can additionally also be applied on the second contact surfaces of the tubular elements adjacent to the thread. These are preferably sealing surfaces that cooperate with each other to form a sealing seat and, if applicable, shoulder surfaces that cooperate with each other, wherein the sealing surfaces are preferably conical and are preferably arranged in screw-in direction adjoining to said female and/or male thread. The thickness of the coating, particularly of the varnish layer, can be chosen to be greater on the second sealing surfaces than on the thread surfaces, i.e. the first contact surfaces. According to one preferred embodiment, the layer thickness of the varnish layer ranges between 10 and 500 µm, preferably between 40 and 300 µm in the area of the second contact surfaces. In particular, it may be provided for that the layer thickness of the varnish layer ranges between 10 and 300 µm, preferably between 40 and 150 µm in the area of the sealing surfaces. In the area of the shoulder surfaces, the layer thickness of the varnish layer can be between 50 and 500 µm, preferably between 150 and 300 µm.

In view of the formation of the total layer thickness, the following embodiments are preferred. The thickness of the coating of the second contact surfaces that cooperate with each other can be less than 340 µm, preferably less than 180 µm, in the area of the sealing surfaces. The thickness of the coating of the second contact surfaces that cooperate with each other can be less than 540 µm, preferably less than 330 µm, in the area of the shoulder surfaces.

According to one preferred embodiment of the invention, the organic polymer of the binding agent of the varnish layer is a polymer that hardens through cross-linking. In particular, the varnish layer consists of a baking varnish with a synthetic resin binding agent or comprises a two-component system of a synthetic resin and a curing agent as a binding agent. The synthetic resin is preferably an alkyd resin, particularly an alkyd resin modified with epoxy resin. For example, a b/w SILVATHERM varnish 2312-3009-90 with wax (polypropylene wax) blended into it can be utilised.

The solid lubricant particles are preferably polymer-based, particularly consisting of a synthetic wax, preferably polyolefin or polyamide or fluoropolymer, most preferably polypropylene wax. The percentage of said solid lubricant particles in the varnish layer can be 1 to 50% w/w, preferably 1 to 20% w/w, more preferably 1 to 10% w/w, most preferably 5% w/w. Such a percentage of wax particles significantly reduces sliding friction, increasing long-term stable sliding performance.

Preferably, it is provided for that the first and the second layer made of ceramic material are formed together as a conversion layer, preferably generated by means of phosphate conversion coating.

Further, it is preferably provided for that said lubricant particles consist of non-crystalline fluorinated hydrocarbons and/or non-high polymer, if applicable derivatised, hydrocarbons or silicones.

Preferably, it is provided for that for application at temperatures below freezing point, the varnish layer is cross-linked to a lesser extent.

According to a further aspect of the invention, a method of the above-mentioned type is carried out such that a layer made of ceramic material with a friction-reducing effect is applied as second layer onto one of the contact surfaces that cooperate with each other and that a varnish layer, throughout which solid lubricant particles are distributed, and which comprises a binding agent made of an organic polymer is applied as second layer onto the other of the two contact surfaces that cooperate with each other.

According to a preferred method, it is provided for that the layer made of ceramic material is applied to the contact surface of the female thread as second layer and the varnish layer is applied to the contact surface of the male thread as second layer.

According to another preferred method, it is provided for that the ceramic layer is applied with a layer thickness of less than 1 μm, preferably less than 200 nm, particularly preferably between 10 and 100 nm. In particular, the ceramic layer can be produced advantageously by means of wet chemical precipitation of nanoparticles, particularly $SiO_2$ nanoparticles. Here, the solution can consist of ethyl diglycol or reaction ethanol, ammonia and tetraethyl orthosilicate (TEOS) and water.

Additionally, the tubular element can be immersed with its thread into a bath of said solution with primarily perpendicular pipe axis, wherein the level of said bath is preferably increased by arranging a displacement body within the tubular element. Alternatively, it can be proceeded such that said tubular element is immersed with a circumferential portion into a bath of said solution with a primarily horizontal pipe axis and is rotated around said pipe axis.

The varnish layer can preferably be applied by spraying. The varnish is advantageously applied by means of a spraying gun and then cured at 130-180° C. for 7-20 min. Tests showed that varnish layers of less than 5 μm tend to erode prematurely and varnish layers exceeding 80 μm exhibit moment anomalies during screwing. Advantageous varnish layer thicknesses, particularly those for the area of the first contact surfaces, are 10-40 μm. The tubular element comprising a female thread and the tubular element comprising a male thread can be, for example, two pipes or one pipe and one socket.

Figure 2:
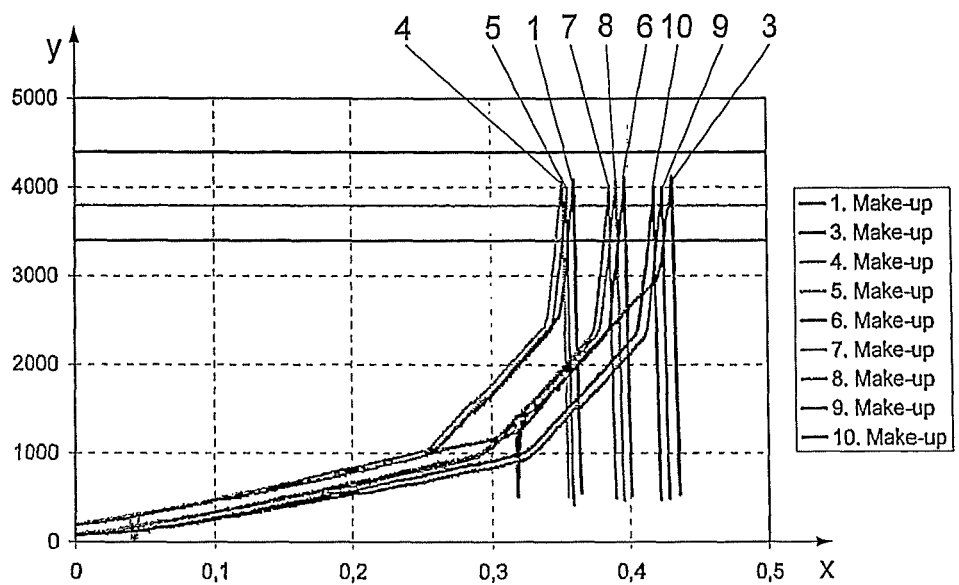
Figure 3:
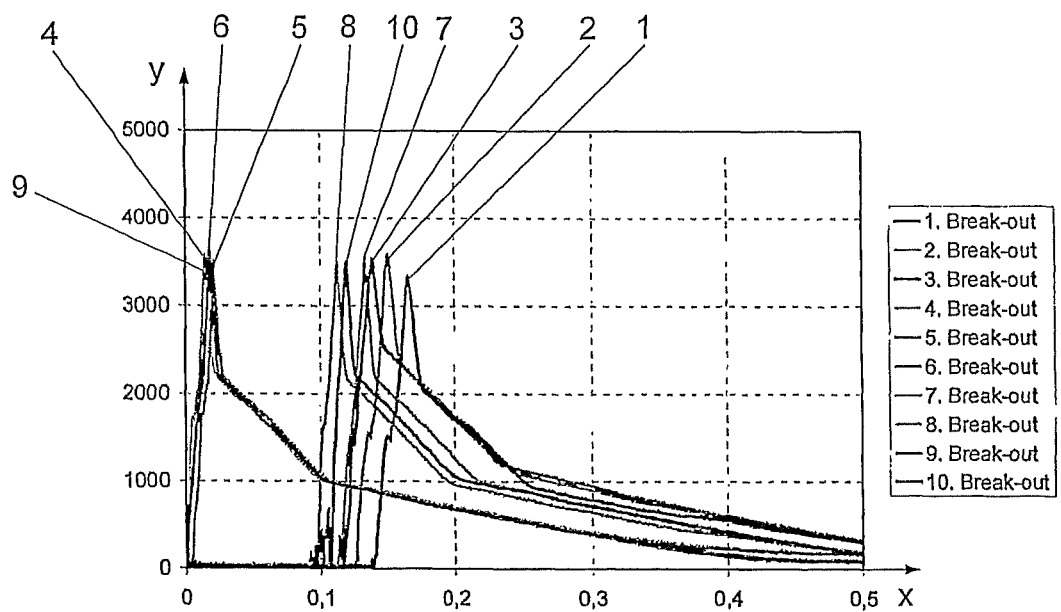
Figure 4:
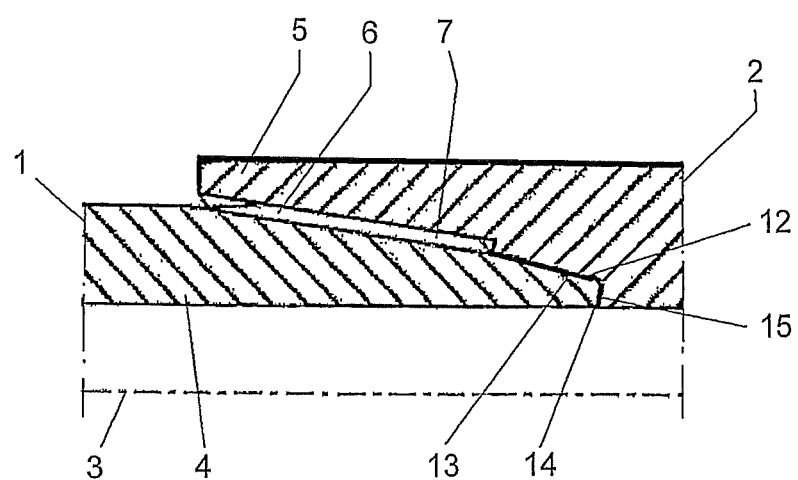

The invention is discussed in more detail below with reference to an example embodiment schematically shown in the drawing. In this drawing, FIG. 1 shows the individual coatings of the female and of the male thread, FIGS. 2 and 3 show the progression of the torque measured during screwing together and unscrewing of the threaded connection as a function of the rotations and FIG. 4 shows a section of a screw joint in the screwed-together state.

FIG. 1 shows a pipe portion 1 comprising a male thread 6 and a pipe portion 2 as a socket comprising a female thread 7. The pipe portion 1 comprises a pipe axis 3, wherein the wall is designated with 4. The wall of the pipe portion 2 is designated with 5. The male thread 6 and the female thread 7 are formed with contact surfaces that cooperate with each other such that the pipe portion 1 can be screwed into pipe portion 2 formed as a socket to produce a threaded connection between the two pipe portions.

Onto each of the contact surfaces of the male thread 6 and the female thread 7, a first layer 8 and 9, respectively, is applied directly, which is a manganese phosphate layer in each case. The manganese phosphate coatings 8 and 9 have a thickness of 5 to 20 μm, preferably 10-15 μm.

A varnish layer 10 into which wax particles are dispersed is positioned on the manganese phosphate layer 8 of the pipe portion 1. The varnish layer 10 is preferably realised with a varnish with the trade name SILVATHERM 2312-3009-90. This is a baking varnish on the basis of an alkyd resin modified with epoxy resin. The wax particles are preferably particles made of polypropylene wax, wherein a particle diameter of less than 20 μm, particularly between 2-10 μm, is preferred. The varnish is applied to the metallic sealing seat, the shoulder surfaces and the male threads 10 and then cured at 130-180° C. for about 7-20 min in a temperature chamber. The varnish layer has a thickness of 5-80 μm, particularly 10-40 μm. A baking varnish on the basis of an alkyd resin modified with epoxy resin does not show any significant degradation of the tribological characteristics, even at low temperatures of up to −40° C.

A nano quartz layer 11 with a layer thickness of <1 μm is arranged on the manganese phosphate layer 9 of the pipe portion 2.

Tests with such a combination of materials on the contact surfaces of the threaded connection have revealed that there was a constant friction of about 0.06 over a test duration of 400 cycles.

FIGS. 2 and 3 depict measurements of the progression of the torque during screwing (FIG. 2) and unscrewing (FIG. 3) of the threaded connection according to FIG. 4 as a function of the rotations. On the x-axis, the rotations are shown, on the y-axis, the torque in nm. The measurements of ten successive processes of screwing and/or unscrewing are mapped, wherein the measured values are numbered as 1 to 10 according to the order of the processes of screwing and/or unscrewing.

It can be seen that with no additional lubrication, a constant torque progression is given even with 10 successive screwing processes.

FIG. 4 shows one embodiment of the invention, wherein the two pipe portions 1 and 2 are depicted in a screwed together state. The male thread 6 and the female thread 7 are conical and have first contact surfaces that cooperate with each other. Subsequent to the male and female threads 6,7, the pipe portions 1,2 each have second contact surfaces that cooperate with each other, namely sealing surfaces 12 and 13 that lie flat against each other and cooperate with each other as well as shoulder surfaces 14 and 15 that lie flat against each other and cooperate with each other. Preferably, the sealing surfaces 12,13 are conical. The shoulder surfaces 14,15 are mostly inclined with respect to the axis 3 such that the two pipe portions 1 and 2 are pressed against each other upon tightening of the screw joint at the shoulder surfaces 14,15, but also at the sealing surfaces 12,13.

The invention claimed is:

1. A screw joint comprising a tubular element having a female thread and a tubular element having a male thread,
    said male thread and said female thread having first contact surfaces that cooperate with each other,
    the tubular elements having second contact surfaces that cooperate with each other and are different than said male and female threads and said first contact surfaces, wherein said second contact surfaces are adjacent to said female thread or said male thread that cooperate with each other,
    said first contact surfaces and said second contact surfaces having a coating which has at least a first and a second layer,
    wherein said first layer is formed as a conversion layer in each case,
    wherein one of said first contact surfaces that cooperate with each other and one of said second contact surfaces that cooperate with each other has an outermost second a layer as a ceramic layer comprised of ceramic material with a friction reducing effect, wherein said ceramic layer has a thickness of less than 1 μm, and wherein said ceramic layer comprises a titanium, zirconium, niobium, tantalum, molybdenum, chromium, silicon, vanadium, tungsten, or germanium oxide or combinations thereof, and wherein the other of the first contact surfaces that cooperate with each other and the other of the second contact surfaces that cooperate with each other have a different outermost second layer, said different outermost second layer comprised of a varnish layer with a binding agent comprised of an organic polymer, throughout which solid lubricant particles are distributed.

2. The screw joint according to claim 1, wherein said second layer comprised of a ceramic material is formed on said tubular element with said female thread and said second layer consisting of a varnish layer is formed on said tubular element with said male thread.

3. The screw joint according to claim 1, wherein said ceramic layer includes a resin or a hydrophobing agent, in order to increase corrosion resistance.

4. The screw joint according to claim 1, wherein said ceramic layer consists of a wet chemical, a self-depositing precipitate or a ceramic prepolymer with organic components applied by means of coating.

5. The screw joint according to claim 1, wherein
(a) said first layer is formed as a phosphate layer,
(b) said first layer consists of
  (a) at least one of manganese phosphate, iron phosphate, or zinc phosphate, or
  (b)
    (i) at least one of manganese phosphate, iron phosphate, or zinc phosphate, and
    (ii) nickel salts,
(c) said first layer consists of manganese phosphate and zinc phosphate, or
(d) said first layer consists of manganese phosphate.

6. The screw joint according to claim 1, wherein said second contact surfaces comprise sealing surfaces that cooperate with each other to form a sealing seat and further comprise shoulder surfaces that cooperate with each other.

7. The screw joint according to claim 6, wherein said varnish layer has a thickness of between 10 and 300 µm, in the area of said sealing surfaces.

8. The screw joint according to claim 6, wherein said varnish layer has a thickness of between 50 and 500 µm, in the area of said shoulder surfaces.

9. The screw joint according to claim 6, wherein the thickness of said coating of said second contact surfaces that cooperate with each other is less than 340 µm, in the area of said sealing surfaces.

10. The screw joint according to claim 9, said thickness of said coating of said second contact surfaces that cooperate with each other is less than 180 µm, in the area of said sealing surfaces.

11. The screw joint according to claim 6, wherein the thickness of said coating of said second contact surfaces that cooperate with each other is less than 540 µm, in the area of said shoulder surfaces.

12. The screw joint according to claim 11, wherein said thickness of said coating of said second contact surfaces that cooperate with each other is less than 330 µm, in the area of said shoulder surfaces.

13. The screw joint according to claim 6, wherein said sealing surfaces are conical.

14. The screw joint according to claim 6, wherein said sealing surfaces are arranged in screw-in direction adjoining to said female and male thread, respectively.

15. The screw joint according to claim 6, wherein said varnish layer has a thickness of between 40 and 150 µm, in the area of said sealing surfaces.

16. The screw joint according to claim 6, wherein said varnish layer has a thickness of between 150 and 300 µm, in the area of said shoulder surfaces.

17. The screw joint according to claim 1, wherein said varnish layer has a thickness of between 5 and 80 µm, in the area of said first contact surfaces.

18. The screw joint according to claim 17, wherein said varnish layer has a thickness of between 10 and 40 µm, in the area of said first contact surfaces.

19. The screw joint according to claim 1, wherein said varnish layer has a thickness of between 10 and 500 µm, in the area of said second contact surfaces.

20. The screw joint according to claim 19, wherein said varnish layer has a thickness of between 40 and 300 µm, in the area of said second contact surfaces.

21. The screw joint according to claim 1, wherein said varnish layer has a smaller thickness in the area of said first contact surfaces than in the area of said second contact surfaces.

22. The screw joint according to claim 1, wherein said organic polymer of said binding agent of said varnish layer is a polymer that hardens through cross-linking.

23. The screw joint according to claim 1, wherein said varnish layer consists of a baking varnish with a synthetic resin binding agent, or comprises a two-component system of a synthetic resin and a curing agent as a binding agent.

24. The screw joint according to claim 23, wherein said synthetic resin is an alkyd resin, or an alkyd resin modified with epoxy resin.

25. The screw joint according to claim 1, wherein said solid lubricant particles are polymer-based and consist of a synthetic wax, a polyamide or a fluoropolymer.

26. The screw joint according to claim 1, wherein the percentage of said solid lubricant particles in said varnish layer is 1 to 50% w/w.

27. The screw joint according to claim 26, wherein the percentage of said solid lubricant particles in said varnish layer is 1 to 20% w/w.

28. The screw joint according to claim 27, wherein the percentage of said solid lubricant particles in said varnish layer is 1 to 10% w/w.

29. The screw joint according to claim 28, wherein the percentage of said solid lubricant particles in said varnish layer is 5% w/w.

30. The screw joint according to claim 1, wherein the thickness of said coating of said first contact surfaces that cooperate with each other is less than 120 µm.

31. The screw joint according to claim 30, wherein said thickness of said coating of said first contact surfaces that cooperate with each other is less than 70 µm.

32. The screw joint according to claim 1, wherein said first and said second layer comprised of ceramic material are formed together as a conversion layer.

33. The screw joint according to claim 1, wherein said lubricant particles consist of
(a) non-crystalline fluorinated hydrocarbons,
(b) non-high polymer, hydrocarbons or silicones, or
(c) a combination of (a) and (b).

34. The screw joint according to claim 1, wherein said ceramic layer has a thickness of less than 200 nm.

35. The screw joint according to claim 1, wherein said ceramic layer has a thickness of between 10 and 100 nm.

36. The screw joint according to claim 1, wherein said varnish layer has a thickness of between 5 and 80 µm, in the area of said first contact surfaces, said varnish layer has a thickness of between 10 and 500 µm, in the area of said second contact surfaces, and said varnish layer has a smaller thickness in the area of said first contact surfaces than in the area of said second contact surfaces.

\* \* \* \* \*